United States Patent [19]
Sakamoto

[11] Patent Number: 5,105,274
[45] Date of Patent: Apr. 14, 1992

[54] CIRCUITS FOR REDUCING NOISE IN A VIDEO SIGNAL

[75] Inventor: Etsurou Sakamoto, Kanagawa, Japan
[73] Assignee: Sony Corporation, Tokyo, Japan
[21] Appl. No.: 577,608
[22] Filed: Sep. 5, 1990

[30] Foreign Application Priority Data

Sep. 27, 1989 [JP] Japan .................. 1-249030

[51] Int. Cl.$^5$ ........................... H04N 5/208
[52] U.S. Cl. ........................ 358/167; 358/340
[58] Field of Search ........... 358/166, 167, 162, 340, 358/336, 36, 37

[56] References Cited

U.S. PATENT DOCUMENTS

| | | | |
|---|---|---|---|
| 3,875,584 | 4/1975 | Fletcher et al. | 358/36 |
| 4,400,721 | 8/1983 | Macovski | 358/37 |
| 4,463,375 | 7/1984 | Macovski | 358/37 |
| 4,575,760 | 3/1986 | Nakagaki et al. | 358/167 |
| 4,635,120 | 1/1987 | Ichinoi | 358/166 |
| 4,646,153 | 2/1987 | Fukuda et al. | 358/167 |
| 4,703,343 | 10/1987 | Honjo | 358/167 |
| 4,748,498 | 5/1989 | Yamanishi et al. | 358/167 |
| 4,827,342 | 5/1989 | Ohta et al. | 358/167 |
| 4,831,435 | 5/1989 | Song et al. | 358/167 |
| 4,849,826 | 7/1989 | Ohta | 358/166 |
| 4,860,105 | 8/1989 | Sakaguchi et al. | 358/340 |
| 4,864,404 | 9/1989 | Matsuo | 358/340 |
| 4,885,639 | 12/1989 | Nakata et al. | 358/67 |
| 4,931,743 | 6/1990 | Fukuda et al. | 358/167 |
| 4,961,113 | 10/1990 | Okada et al. | 358/167 |
| 4,962,434 | 10/1990 | Matsuo | 358/340 |
| 5,005,081 | 4/1991 | Asano | 358/167 |

FOREIGN PATENT DOCUMENTS

| | | |
|---|---|---|
| 0067975 | 3/1981 | Japan . |
| 0285872 | 12/1986 | Japan . |
| 0260276 | 10/1988 | Japan . |
| 0268376 | 11/1988 | Japan . |

*Primary Examiner*—James J. Groody
*Assistant Examiner*—Jeffrey S. Murrell
*Attorney, Agent, or Firm*—Alvin Sinderbrand; William S. Frommer

[57] ABSTRACT

A first circuit includes a high pass filter for extracting a high band signal component of an incoming video signal and a limiter for amplitude-limiting an output signal of the high-pass filter. A second circuit detects correlation in the vertical direction of the video signal and a weighting circuit weights an output signal of the second circuit in response to the output signal of the high-pass filter. An adding circuits adds an output signal of the first circuit and a weighted output signal of the second circuit, and subtracting circuit subtracts an output signal of the adding circuit and the video signal from each other, in order to reduce the noise in the incoming video signal. In this manner, noise remaining at the edge portion of a video image signal can be removed effectively.

14 Claims, 6 Drawing Sheets

CIRCUITS FOR REDUCING NOISE IN A VIDEO SIGNAL

BACKGROUND OF THE INVENTION

1. Field of the Invention

The present invention relates to a noise reducing circuit which can effectively reduce a noise in a video signal.

2. Description of the Prior Art

Figure 1A:
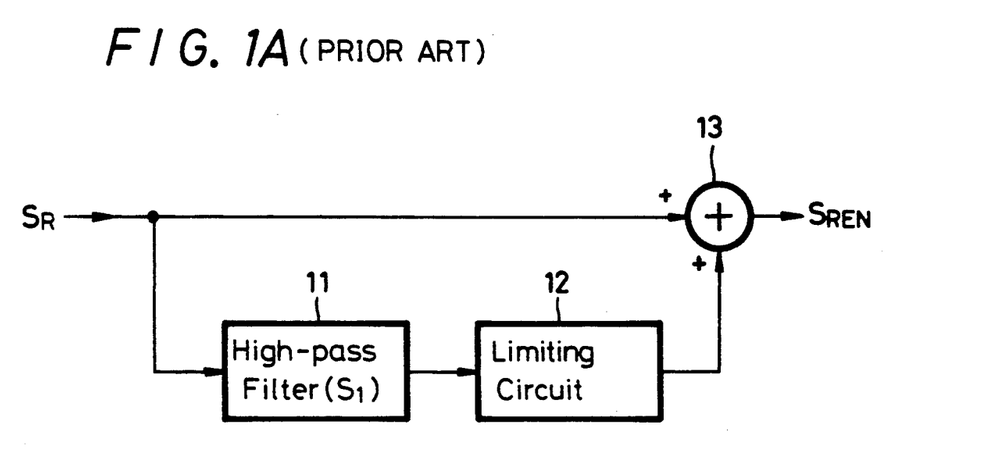
FIG. 1A is a schematic diagram showing an example of a prior-art emphasizing circuit.
Figure 1B:
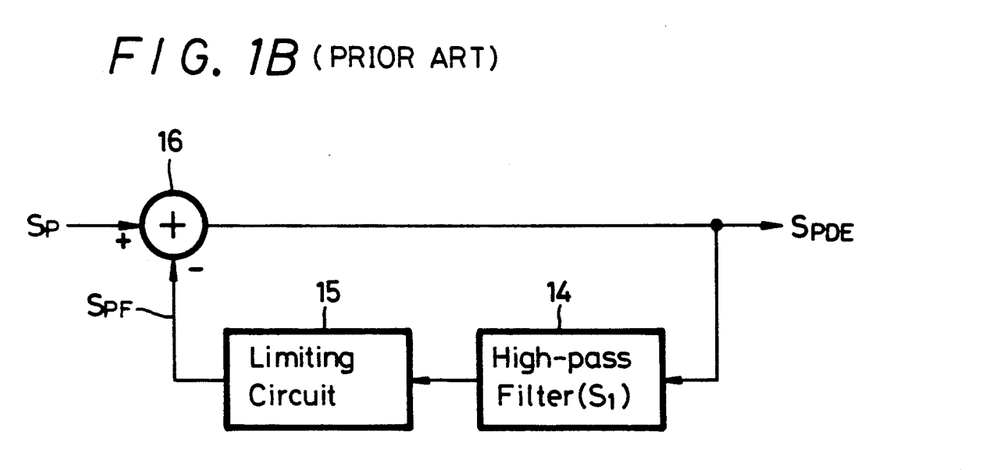
FIG. 1B is a schematic diagram showing an example of a prior-art de-emphasizing circuit.

In a prior-art video tape recorder (VTR), as shown in FIG. 1A, a high band frequency component of a video signal is emphasized in a recording signal $S_R$ by an emphasizing circuit comprised of a high-pass filter 11 having a transfer function $S_1$, a limiting circuit 12 and an adder 13 and the emphasized recording signal is then recorded on a video tape (not shown) or the like. Conversely, during a reproducing operation, as shown in FIG. 1B, a reproducing signal $S_P$ is de-emphasized by a de-emphasizing circuit comprised of a high-pass filter 14 having the same transfer function $S_1$ as high-pass filter 11, a limiting circuit 15 and a subtracting circuit 16. Thus, a waveform similar to that of the recording video signal is obtained in which the noise, is reduced.

Figure 2A:
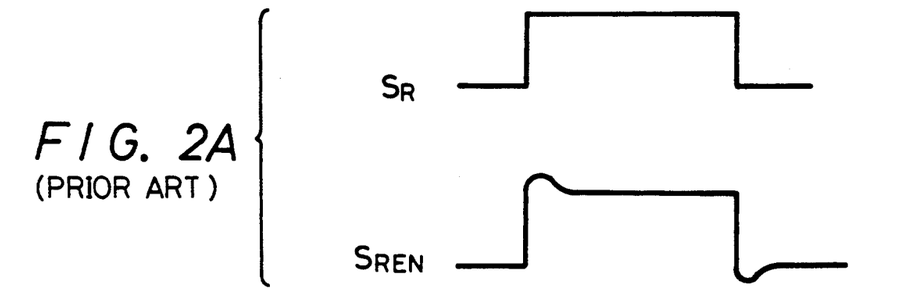
FIGS. 2A and 2B are signal waveform diagrams to which reference will be made in explaining operations of the emphasizing circuit and the de-emphasizing circuit shown in FIGS. 1A and 1B, respectively.

In that case, a waveform of an output signal $S_{REN}$ from the emphasizing circuit supplied with the recording signal $S_R$ is as shown in FIG. 2A, in which a signal produced by amplitude-limiting a differentiated waveform is added to the edge portion of the video signal which is rapidly changed in the horizontal direction.

Figure 2B:
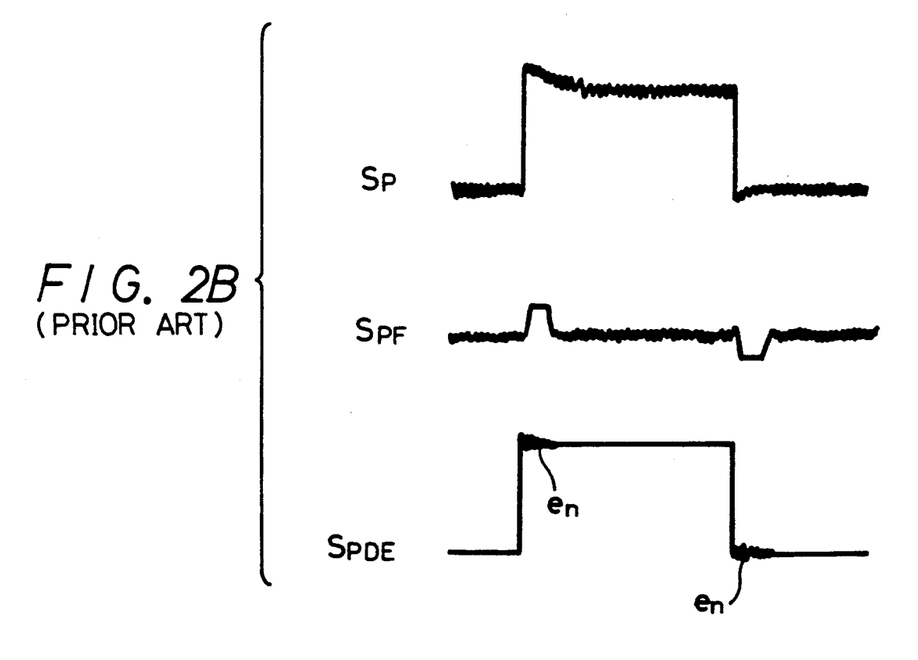

In the de-emphasizing circuit, a signal $S_{PF}$ produced by extracting the high band signal component of the reproduced signal is subtracted from the reproducing signal $S_P$ to produce a waveform $S_{PDE}$ similar to that of the recording signal, as shown in FIG. 2B. This de-emphasizing circuit removes a small level noise signal comprised of a high band signal component.

However, if the noise removing operation is made more powerful by increasing the emphasizing amount, then the amplitude-limiting amount of the differentiated waveform of the high-pass filter output is increased so that, after the differentiated waveform portion is limited and subtracted from the video signal by the de-emphasizing circuit, as shown in FIG. 2B, a certain noise en remains on the edge portions of the video signal. This edge noise en will be more fully described below.

Figure 3A:
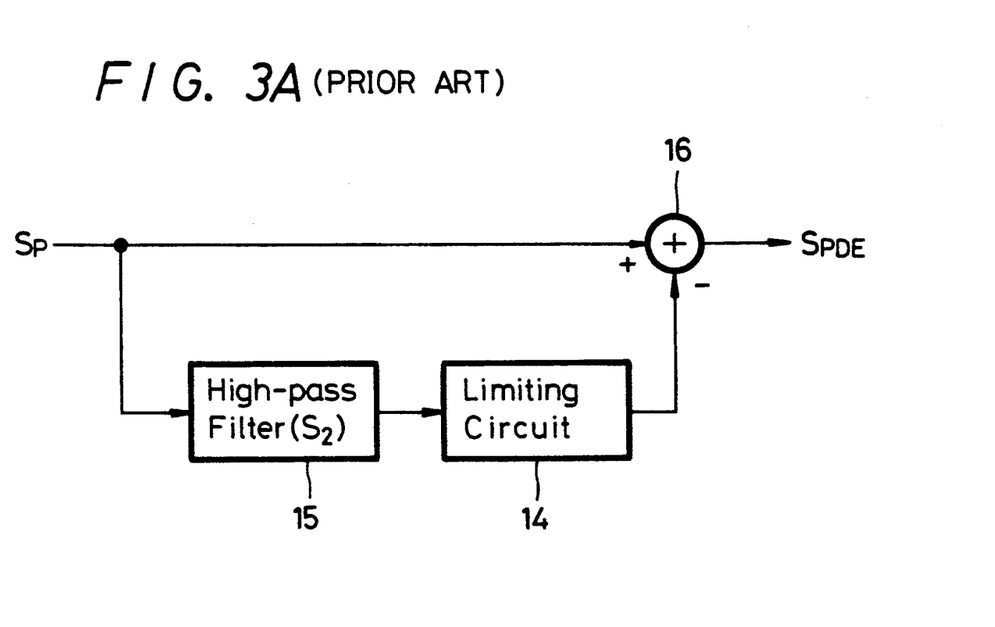
FIG. 3A is a schematic diagram showing another example of a prior-art de-emphasizing circuit.
Figure 3B:
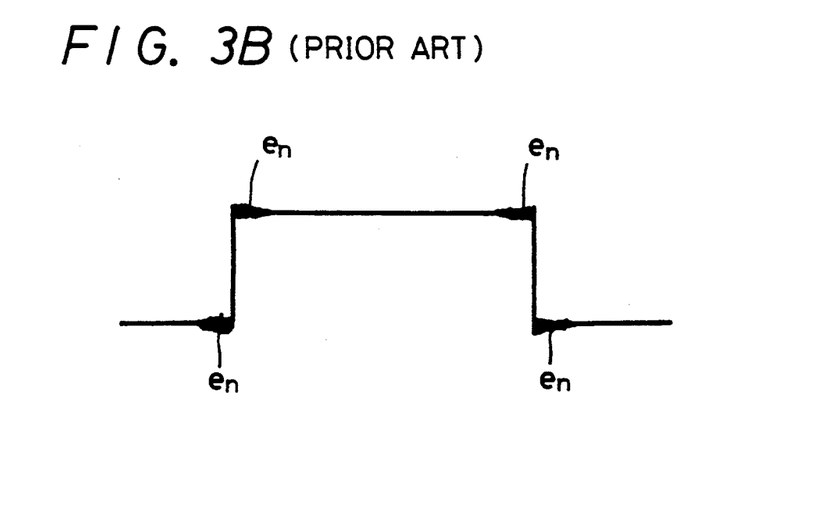
FIG. 3B is a signal waveform diagram to which reference will be made in explaining the de-emphasizing circuit shown in FIG. 3A.

If the de-emphasizing circuit is comprised of a linear phase feedforward circuit, as shown in FIG. 3A, the noise en remains in the undershoot portion and peak portion of the video signal as shown in FIG. 3B. In such case, if the amplitude-limiting amount of the differentiated waveform is decreased so as to reduce the edge noise en, then there is the substantial disadvantage that the resolution of a video image will be deteriorated.

OBJECTS AND SUMMARY OF THE INVENTION

Accordingly, it is an object of the present invention to provide an improved noise reducing circuit which can eliminate the aforenoted shortcomings and disadvantages encountered with the prior art.

More specifically, it is an object of the present invention to provide a noise reducing circuit which can effectively reduce a noise.

It is another object of the present invention to provide a noise reducing circuit which can effectively remove a noise remaining at the edge portion of a video image signal.

According to a first aspect of the present invention, a noise reducing circuit for removing a noise of an incoming video signal is comprised of a first circuit which includes a high-pass filter for extracting a high band signal component of the incoming video signal, and a limiter for amplitude-limiting an output signal of the high-pass filter, a second circuit for detecting a correlation in the vertical direction of the video signal, a weighting circuit for weighting an output signal of the second circuit in response to the output signal of the high-pass filter, adding means for adding an output signal of the first circuit and a weighted output signal of the second circuit, and means for subtracting an output signal of the adding means and the incoming video signal from each other.

According to a second aspect of the present invention, a noise reducing circuit for removing an noise of an incoming video signal is comprised of a first circuit which includes a high-pass filter for extracting a high band signal component of the incoming video signal, and a limiter for amplitude-limiting an output signal of the high-pass filter, a second circuit for detecting a correlation in the vertical direction of the video signal, a weighting circuit for weighting an output signal of the second circuit in response to the output signal of the high-pass filter, first adding means for adding an output signal of the first circuit and adding means output signal of the second circuit, and second adding means for adding an output signal of the first adding means and the incoming video signal.

In accordance with yet a third aspect of the present invention, a noise reducing system for removing a noise of an incoming video signal includes an emphasizing circuit and a de-emphasizing circuit. In such case, the emphasizing circuit is comprised of a first circuit which includes a first high-pass filter for extracting a high band signal component of the incoming video signal, a first limiter for amplitude-limiting an output signal of the first high-pass filter, a second circuit for detecting correlation in the vertical direction of the incoming video signal, a first weighting circuit for weighting an output signal of the second circuit in response to the output signal of the first high-pass filter, first adding means for adding the output signal of the first circuit and the weighted output signal of the second circuit and second adding means for adding an output signal of the first adding means and the incoming video signal. The de-emphasizing circuit is comprised of a third circuit which includes second high-pass filter for extracting a high band signal component of the video signal processed by the emphasizing circuit, a second limiter for amplitude-limiting an output signal of the second high-pass filter, a fourth circuit for detecting a correlation in the vertical direction of the video signal, a second weighting circuit for weighting an output signal of the fourth circuit in response to the output signal of the second high-pass filter, third adding means for adding an output signal of the third circuit and a second weighted output signal of the fourth circuit, and means for subtracting an output signal of the third adding means and the video signal from each other.

The above, and other objects, features and advantages of the present invention will be apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

Referring to the drawings in detail, and initially to FIG. 4, an embodiment of the noise reducing circuit according to the present invention will hereinafter be described with reference thereto.

Figure 4:
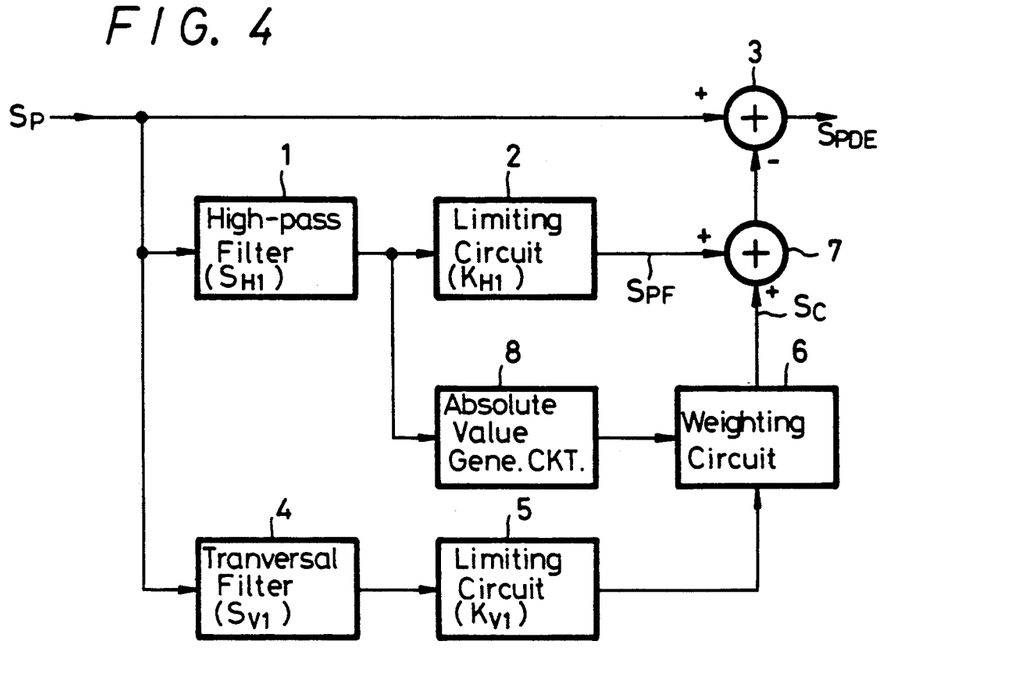
FIG. 4 is a schematic block diagram showing an embodiment of a noise reducing circuit according to the present invention.

In the embodiment of FIG. 4, an incoming video signal $S_P$ is supplied through a high-pass filter 1 having a transfer function $S_{H1}$ to a first limiting circuit 2 having a coefficient $K_{H1}$. The first limiting circuit 2 may be a limiting circuit having a non-linear characteristic.

Preferably, the high-pass filter 1 and the first limiting circuit 2 should have the transfer function and coefficient respectively, which correspond to the emphasized amount of the incoming video signal, as will be later described more fully.

A subtracting circuit 3, the high-pass filter 1, and the first limiting circuit 2 are arranged so as to constitute a prior-art noise reducing circuit. Although the circuit arrangement of this prior-art noise reducing circuit functions as a de-emphasizing circuit because it has a high-pass filter characteristic corresponding to the de-emphasized amount of the incoming video signal, for the sake of simplicity, this circuit arrangement will hereinafter be referred to as the noise reducing circuit.

As further shown in FIG. 4, the incoming video signal $S_P$ is also supplied to a transversal filter 4 which includes a 1H (H represents one horizontal scanning period) delay circuit and has a high-pass filter characteristic to extract a high band signal component in the vertical direction of the incoming video signal, as will be described later. Further, an output signal of the transversal filter 4 is amplitude-limited by a second limiting circuit 5 so as to have a predetermined level.

A weighting circuit 6 is provided in which an input signal from the limiting circuit 5 is multiplied with coefficients 0 to 1 which change in response to the output signal from the high-pass filter 1. The output of the weighting circuit 6 is then supplied to one input of an adder 7. In this embodiment, the output signal of the high-pass filter 1 is supplied through an absolute value generating circuit 8 to the weighting circuit 6 for controlling the latter.

Figure 5:
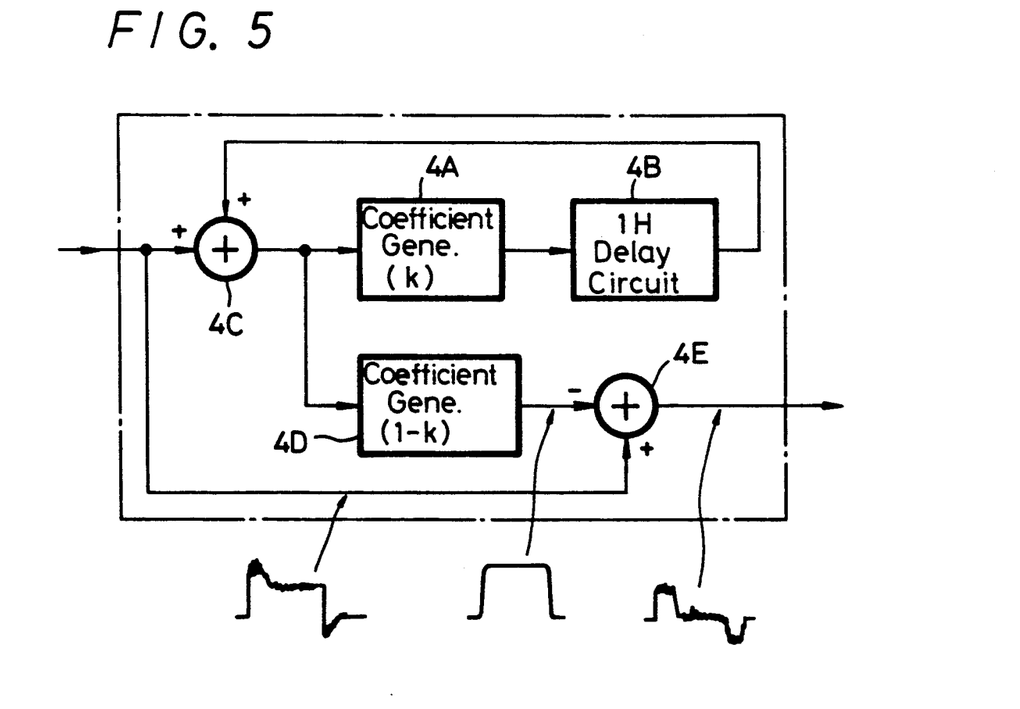
FIG. 5 is a schematic block diagram showing an example of a transversal filter employed in the embodiment of FIG. 4.

FIG. 5 shows in greater detail an example of the transversal filter 4 which is comprised of coefficient generators 4A, 4D, a 1H delay circuit 4B, an adder 4C and a subtracter 4E.

The circuit in FIG. 5 represents a portion of a vertical de-emphasizing circuit in which a high band signal component which is produced when the video signal is changed in the vertical direction on the picture screen is extracted and output by the subtracter 4E. This high band signal component is supplied through the second limiting circuit 5 and the weighting circuit 6 to the adder 7, and through the latter to the subtracter 3, for thereby removing the edge noise that can not be fully removed by the operation of the high-pass filter 1 and the first limiting circuit 2 constituting a horizontal de-emphasizing circuit.

An operation of the noise reducing circuit of FIG. 4 will now be described with reference to the waveform diagrams shown in FIG. 6.

When the video signal in which the high band frequency component is emphasized is reproduced to provide the video signal $S_P$, and the same is supplied to the noise reducing circuit, the high band signal $S_{PF}$ of low level is extracted by the high-pass filter 1 and the first limiting circuit 2 similarly, as in the prior art. This high band signal component $S_{PF}$ is then supplied through the adder 7 to the subtracter 3, whereby the high band signal component is removed from the reproduced signal $S_P$. Thus, when the de-emphasis operation is performed, the noise can be removed simultaneously.

When the high band signal component output from the high-pass filter 1 is small, or when the video signal has no edge portion at which the level is changed rapidly, the coefficient of the weighting circuit 6 is near zero (0) so that the part of the circuit including the transversal filter 4 is disabled.

Figure 6:
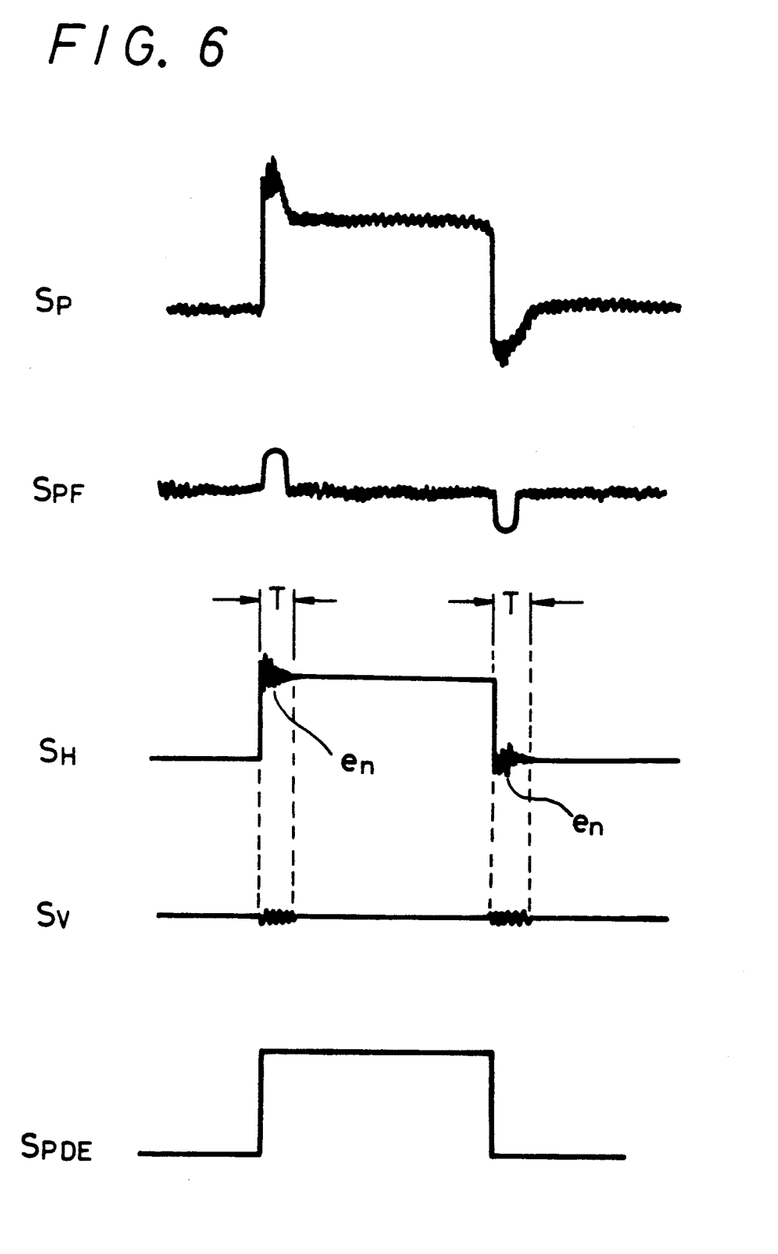
FIG. 6 shows signal waveforms to which reference will be made in explaining an operation of the noise reducing circuit shown in FIG. 4.

When the high band signal component output from the high-pass filter 1 is large, or during the period T in which the video signal has an edge portion at which the level is changed rapidly, as represented by the waveform $S_H$ in FIG. 6, the noise en remains in the edge portion of the signal output from the subtracter 3.

However, according to the noise reducing circuit of the present invention, the coefficient of the weighting circuit 6 approaches one (1) at this edge portion so that the high band frequency signal is detected by the transversal filter 4 and indicating the level change in the vertical direction, that is, the noise component, is supplied through the adder 7 to the subtracter 3, as shown in FIG. 4. Then, at the edge portion of the signal which rapidly changes in the horizontal direction, there remains a noise which is similar to the extracted noise, as represented by the signal $S_V$ in FIG. 6. The extracted noise signal $S_V$ is supplied to the subtracter 3, in which the noises cancel each other out so as to remove the noise en remaining in the video signal. More specifically, this noise reducing circuit also functions as the vertical de-emphasizing circuit at the edge portion of the video signal in which the level is rapidly changed in the horizontal direction, thereby removing the noise in the horizontal edge portion of the video signal.

As earlier noted, in the noise reducing circuit embodying the present invention, when the level change of the video signal is small, the horizontal de-emphasizing circuit comprised of the high-pass filter 1 and the first limiting circuit 2, is employed to reduce the noise. If the level of the video signal is rapidly changed in the horizontal direction, then the high band signal component output from the high-pass filter 1 is increased and the vertical de-emphasizing circuit, comprised of the transversal filter 4 and the second limiting circuit 5, is made effective to remove noise by the comb-filter characteristic of the vertical de-emphasizing circuit, and a reproduced signal $S_{PDE}$ with reduced noise is obtained from the output of the subtracter 3.

Figure 7:
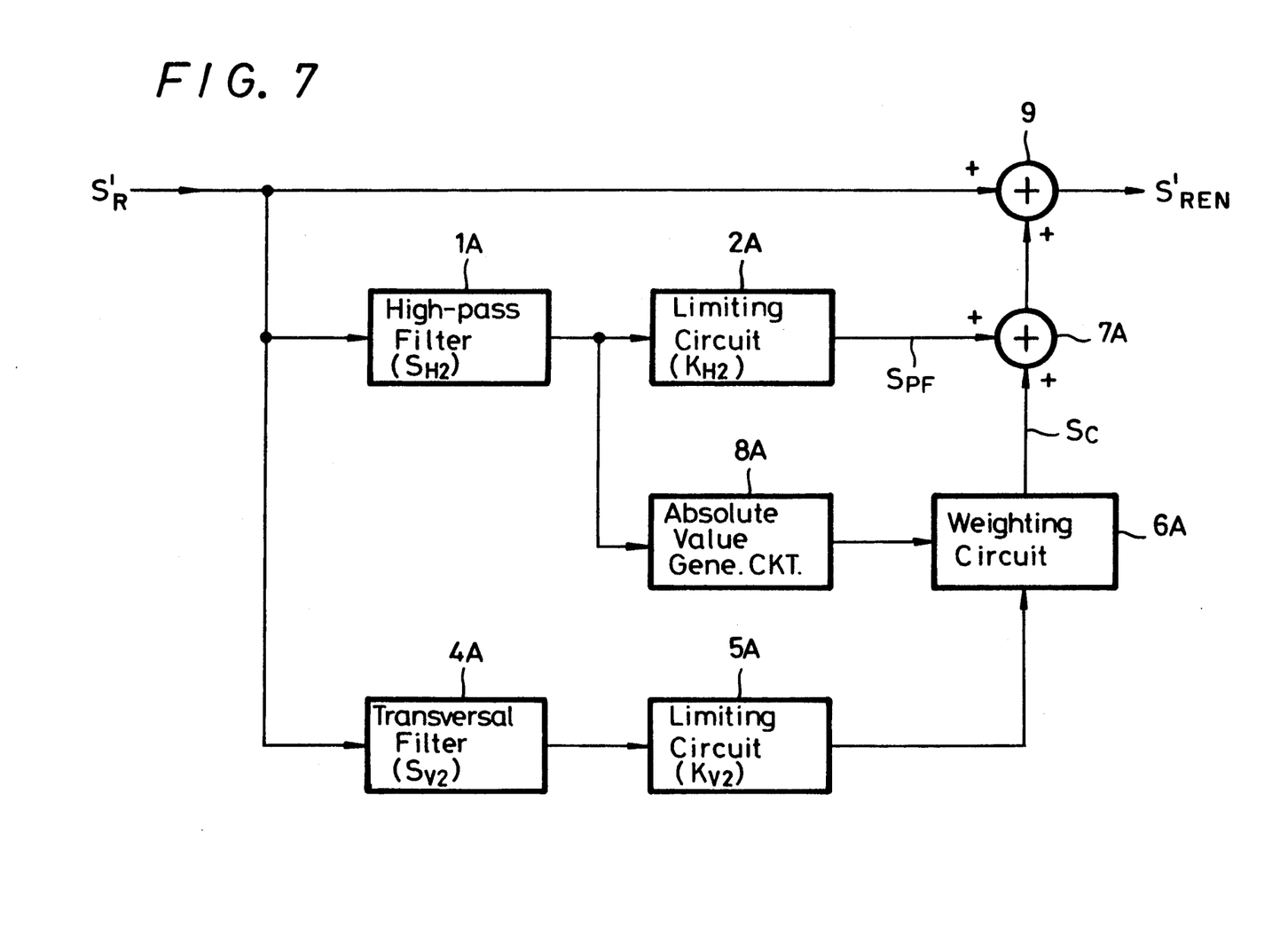
FIG. 7 is a schematic block diagram showing an equivalent circuit of an emphasizing circuit corresponding to the noise reducing circuit of FIG. 4.

FIG. 7 shows an emphasizing circuit which emphasizes the high band signal component of the recording video signal and corresponds to the noise reducing circuit of FIG. 4 which functions as a de-emphasizing circuit.

In the emphasizing circuit of FIG. 7, the parts of the circuit which perform the same functions as the parts of the circuit described with reference to FIG. 4 are identified by the same reference numerals, but with the letter A attached thereto. Further, the subtracter 3 in FIG. 4 is replaced with an adder 9 in FIG. 7.

A transfer function $S_{H2}$ of a high-pass filter 1A and a coefficient $K_{H2}$ of a first limiting circuit 2A are calculated so as to satisfy the following equation in response to the transfer function $S_{H1}$ of the high-pass filter 1 and the coefficient KH1 of the first limiting circuit 2 of the de-emphasizing circuit in FIG. 4:

$$(1+S_{H1}\cdot K_{H1})(1-S_{H2}\cdot K_{H2})\approx 1$$

where the coefficient k of the weighting circuit 6 is 0.

Similarly, a transfer function $S_{V2}$ of a transversal filter 4A and a coefficient $K_{V2}$ of a second limiting circuit 5A are determined so as to satisfy the following equation in response to the transfer function $S_{V1}$ of the transversal filter 4 and the coefficient $K_{V1}$ of the second limiting circuit 5:

$$(1+S_{V1}\cdot K_{V1})(1-S_{V2}\cdot K_{V2})\approx 1$$

If the transfer functions are determined in the above-described manner, then the circuits of FIGS. 7 and 4 function as frequency compensating circuits in the recording and reproducing systems of the video tape recorder, and the circuits can also reduce the noise of the recording signal simultaneously.

Alternatively, a transversal filter of a different circuit arrangement can be used and an amplitude limiter having a non-linear characteristics can be utilized as the limiting circuit, whereby the de-emphasizing circuit of the present invention may be modified into a non-linear de-emphasizing circuit.

As set forth above, a noise reducing circuit embodying the present invention generally comprises a first circuit for detecting the horizontal high band signal component of small amplitude and a second circuit for extracting the vertical high band frequency of the video signal to perform the horizontal de-emphasizing function and the vertical de-emphasizing function, respectively, so that, when an edge portion of the video signal is detected in the horizontal direction, the vertical de-emphasizing circuit is made operative. Therefore, it is possible to reduce the high band edge noise which tends to occur when the video signal is emphasized.

It should be understood that although a single preferred embodiment of the invention has been described in detail herein many modifications and variations thereof could be effected by one with ordinary skill in the art without departing from the spirit and scope of the invention as defined in the appended claims.

I claim as my invention:

1. A noise reducing circuit for removing noise in an incoming video signal, comprising:

first circuit means including high-pass filter means for extracting a high band signal component of said incoming video signal, and limiter means for amplitude-limiting said high band signal component output from said high-pass filter means and providing a limited output signal;

second circuit means for producing a high band signal component of said incoming video signal corresponding with a change in the vertical direction of said video signal and providing a corresponding output signal;

weighting means for weighting said output signal of said second circuit means in accordance with said high band signal output from said high-pass filter means;

adding means for adding said limited output signal of said limiter means and the weighted output signal of said second circuit means for providing an added output signal; and means for subtracting said added output signal of said adding means from said incoming video signal.

2. The noise reducing circuit as in claim 1, wherein said second circuit means includes transversal filter means for extracting a high band component of said video signal and second limiter means for amplitude-limiting said high band component output from said transversal filter.

3. The noise reducing circuit as in claim 1, wherein said first circuit means processes a horizontal signal component of said video signal.

4. The noise reducing circuit as in claim 1, further comprising absolute value generating means through which said weighting means is supplied with said high band signal output from said high-pass filter means.

5. The noise reducing circuit as in claim 1, further comprising input terminal means for receiving a video signal reproduced by a video tape recorder as said incoming video signal such that said noise reducing circuit is operative for de-emphasizing the reproduced video signal.

6. The noise reducing circuit as in claim 1, wherein said limiter means has a non-linear characteristic.

7. An emphasizing circuit, comprising;

first circuit means including high-pass filter means for extracting a high band signal component of an incoming video signal, and limiter means for amplitude-limiting said high band signal component output from said high-pass filter means and providing a limited output signal;

second circuit means for producing a high band signal component of said incoming video signal corresponding with a change in the vertical direction of said incoming video signal and providing a corresponding output signal;

weighting means for weighting said output signal of said second circuit means in accordance with said high band signal output from said high-pass filter means;

first adding means for adding said limited output signal of said limiter means and the weighted output signal of said second circuit means for providing an added output signal; and second adding means for adding said added output signal of said first adding means and said incoming video signal to produced an emphasized video signal.

8. The emphasizing circuit as in claim 7, wherein said second circuit means includes transversal filter means for extracting a high band component of said video signal and second limiter means for amplitude-limiting said high band signal component from said transversal filter.

9. The emphasizing circuit as in claim 7, wherein said first circuit means processes a horizontal signal component of said video signal.

10. The emphasizing circuit as in claim 7, further comprising absolute value generating means through which said weighting means is supplied with said high band signal output from said high-pass filter means.

11. The emphasizing circuit as in claim 7, further comprising output terminal means for providing said emphasized video signal to video tape recording means for recording on video tape.

12. The emphasizing circuit as in claim 7, wherein said limiter means has a non-linear characterisitic.

13. A noise reducing system for removing noise from an incoming video signal, and which comprises an emphasizing circuit, and a de-emphasizing circuit, said emphasizing circuit comprising:

first circuit means including first high-pass filter means for extracting a high band signal component of said incoming video signal, and first limiter means for amplitude-limiting said high band signal component output from said first high-pass filter means and providing a first limited output signal;

second circuit means for producing a high band signal component of said incoming video signal corresponding with a change in the vertical direction of said incoming video signal and providing a corresponding output signal;

first weighting means for weighting said output signal of said signal circuit means in accordance with said high band signal output from said first high-pass filter means;

first adding means for adding said first limited output signal of said first limiter means and the weighted output signal of said second circuit means for providing an added output signal; and second adding means for adding said added output signal of said first adding means and said incoming video signal to produce an emphasized video signal, and said de-emphasizing circuit comprising:

third circuit means including second high-pass filter means for extracting a high band signal component of said emphasized video signal, and second limiter means for amplitude-limiting said high band signal component output from said second high-pass filter means and providing a second limited output signal;

fourth circuit means for producing a high band signal component of said emphasized video signal corresponding with a change in the vertical direction of said emphasized video signal and providing a corresponding output signal;

second weighting means for weighting said output signal for said fourth circuit means in accordance with said high band signal component output from said second high-pass filter means;

third adding means for adding said second limited output signal of said second limiter means and the weighted output signal of said fourth circuit means for providing an added output signal; and means for substracting said added output signal of said third adding means from said emphasized video signal.

14. The noise reducing system as in claim 13, wherein said emphasizing circuit further comprises output terminal means for providing said emphasized video signal to video tape recording and reproducing means for recording on video tap and wherein said de-emphasizing circuit further comprises input terminal means for receiving said emphasized video signal reproduced by said video tape recording and/or reproducing means.

* * * * *